United States Patent [19]

Cech

[11] 4,138,598

[45] Feb. 6, 1979

[54] HEADSET CONSTRUCTION

[75] Inventor: Karl Cech, Mödling, Austria

[73] Assignee: AKG Akustische u. Kino-Geräte Gesellschaft m.b.H., Austria

[21] Appl. No.: 828,091

[22] Filed: Aug. 26, 1977

[30] Foreign Application Priority Data

Aug. 30, 1976 [AT] Austria ................................ 6416/76

[51] Int. Cl.[2] ................................................ H04M 1/05

[52] U.S. Cl. ................................................ 179/156 A

[58] Field of Search ......................... 179/156 R, 156 A

[56] References Cited

U.S. PATENT DOCUMENTS 2,653,193 9/1953 Anderson ......................... 179/156 R 3,447,160 6/1969 Teder ........................... 179/156 R X

FOREIGN PATENT DOCUMENTS 312358 7/1969 Sweden .............................. 179/156 A

*Primary Examiner*—William C. Cooper

*Attorney, Agent, or Firm*—McGlew and Tuttle

[57] ABSTRACT

The headset comprises a head-encircling band which has a rectangular cross-section, and it includes one or two earpieces which have housings with rectangular slots engaged over and slidable on each band end. In addition, a microphone arm having a microphone at one end and an opposite end with a rotatable ring portion engages through a bore of the ring portion onto the band holding the earpieces or onto a similar band formed on the end of the earpiece housing.

11 Claims, 5 Drawing Figures

HEADSET CONSTRUCTION

FIELD AND BACKGROUND OF THE INVENTION

This invention relates in general to headsets and, in particular, to a new and useful headphone including a microphone, in which the microphone is carried on the end of an arm which is adjustable in various directions relative to the headphone.

DESCRIPTION OF THE PRIOR ART

Headsets are well-known in a great variety of designs. The requirements imposed on such devices are that they should be of a minimum weight, they should include a wide adjustment range for the microphone, and be resistant to rough handling. In general, the devices of the prior art comply with these requirements as to the possibilities of adjustment and the employed mechanisms. However, they are usually too heavy and expensive, or they cannot withstand rough manipulation.

SUMMARY OF THE INVENTION

The present invention provides a headset with a lightweight microphone arm which is capable of withstanding rough handling and may be manufactured in such a simple manner that its cost is also reduced in relation to the headsets of the prior art.

To this end, in accordance with the invention, the microphone arm is designed to be slidably engaged, by its end remote from the microphone, on an extension which is provided on an earpiece or on the headband, and preferably, on one of the ends of the latter.

In a development of the invention, the end portion of the microphone arm to be engaged is thickened and has a passage opening inside of which projections, catchstops, or stops are provided which may match corresponding elements provided on the extensions.

A particularly advantageous embodiment of the invention is one in which the extensions are designed as cylindrical pins, the surface of which may be provided with projections or recesses in the form of riffles or grooves which are conformable to analogous elements provided inside of the passage opening of the microphone arm.

The principal advantage obtained by the invention is that the microphone arm can be disengaged from the one and engaged with the other side, so as to extend, for example, not from the left, but from the right, toward the mouth of the operator.

Since the microphone arm can be pivoted about two distinct axes at an angle to each other and also be easily detached, the inventive headset, including the microphone arm, occupies a very small space during storage or transportation, which is also advantageous.

Another advantageous feature of the invention, is that a bushing may be provided in the thickened end portion of the microphone arm, having inside projections, catchstops, or stops which may correspond to conformable elements on the extensions. The bushing may be made of a resilient material.

A further advantage of the invention is that in case of a failure, the microphone arm can be exchanged even by an inexperienced user.

The microphone arm may be equipped with a separate cable, but it is also possible to unite all lines in once cable and to separate them only in the area of the earpiece. It is further possible to provide a separate cable-distributing box mounted, for example, on the outside of an earpiece and comprising pull relief elements.

Accordingly, it is an object of the invention to provide a headset which comprises a head-encircling band having at least one earpiece with a slot defined therethrough through which the band extends and including a microphone arm having a microphone adjacent one end and an opposite end with an engagement portion which is slidably engageable on the band.

A further object of the invention is to provide a headset which is simple in design, rugged in construction and economical to manufacture.

The various features of novelty which characterize the invention are pointed out with particularity in the claims annexed to the forming a part of this disclosure. For a better understanding of the invention, its operating advantages and specific objects attained by its uses, reference should be had to the accompanying drawing and descriptive matter in which there are illustrated preferred embodiments of the invention.

DESCRIPTION OF THE PREFERRED EMBODIMENTS

Figure 1:
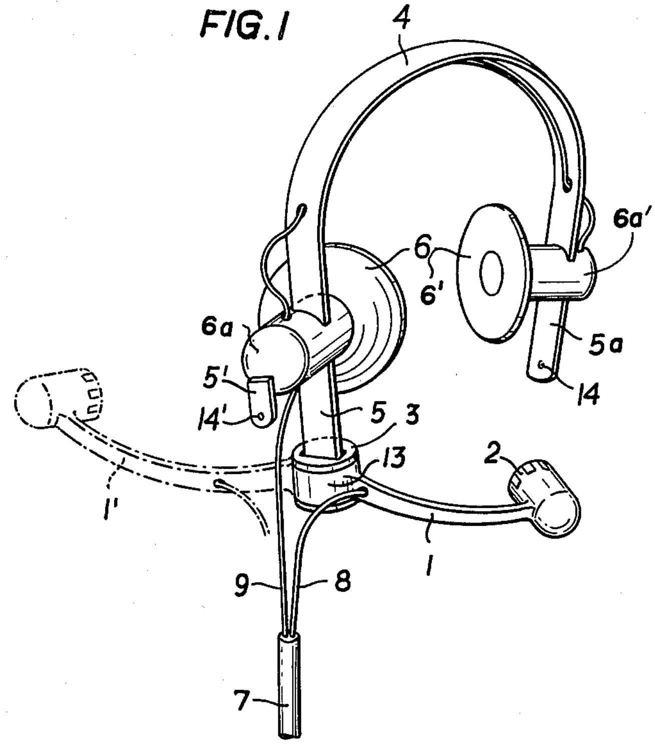
FIG. 1 is a perspective view of an inventive headphone including a microphone arm.

Referring to the drawings in particular, the invention embodied therein comprises a headset which includes a head-encircling band 4 which is of a rectangular, flat construction and which has at least one earpiece 6 mounted thereon by engagement of the band ends 5 and **5*a* through respective slots defined in cylindrical portions 6*a* and 6*a*' of the respective earpieces 6 and 6'. In accordance with the invention, a microphone arm 1 having a microphone 2 at one end has an opposite end with engagement means 3 which engages over a free end 5 of the headband 4 or, alternatively, on a free end of a separate band element 5' secured to the earpiece 6**.

As shown in FIG. 1, the inventive headset may be equipped with a strap or band 4 made, for example, in the form of a U-shaped flat strip or plastic. Two earpieces 6 and 6' are provided with cylindrical housing parts **6*a* and 6*a*' which have flat slot passages therethrough for the band and they are displaceable, in frictional contact, along the respective end portions 5 and 5*a* of the band 4. A microphone arm 1 is slidably engaged on one end portion 5 of the band and carries a microphone 2 on its free end. The electrical connection is established by means of a cable 7 comprising both a pair of wires 9 for the earpieces 6 and a pair of wires 8 for the microphone 2. In the embodiment of FIG. 1, the pull is absorbed by wires 9, so that the microphone wires 8** remain relieved from tension.

Figure 2:
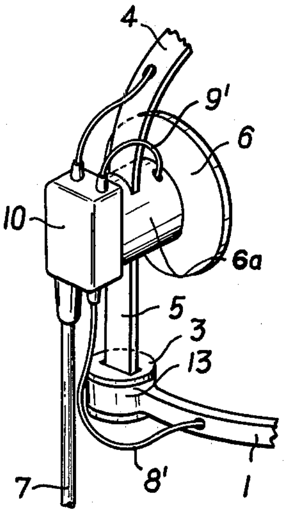
FIG. 2 shows the mounting of a cable-distributing box.

FIG. 2 shows another embodiment in which a cable-distributing box 10 is provided on the outside of earpiece 6, wherefrom, lines 8' and 9' lead to the microphone 2 and the earpiece 6, respectively.

Figure 4:
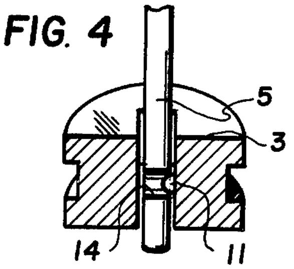
FIG. 4 is a cross-sectional view taken along the line 4—4 of FIG. 3.
Figure 3:
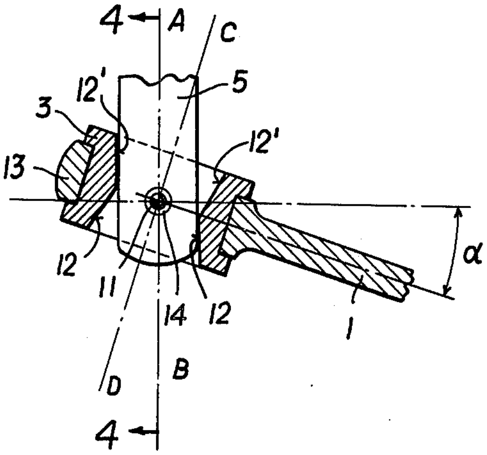
FIG. 3 is a detail showing the mounting of the microphone arm at the end of the headband.

In FIG. 1, the headband end 5 carrying the microphone arm is designed as an extension having a rectangular cross-section. The passage opening of a rotatable clamping ring 3 of an annular thickened end portion 13 of microphone arm 1 also has a rectangular cross-section. The ring 3 is rotatable in end portion 13 and it has a bore which is tapered inwardly from both sides to the middle, thereby, forming top and bottom stop surfaces 12 and 12'0 against which the narrow surfaces of extension 5 apply, as shown in detail in FIG. 3. In addition, a catch pin 11 may be provided, for example, in the shape of a conical projection on the inside of the passage opening of clamping ring 3 or of thickened end 13 of microphone arm 1, and a corresponding recess or bore 14, 14' may be provided in extension 5, as shown in FIG. 4.

A band 5' may be secured to the cylindrical housing 6a holding a microphone arm 1, if desired. Bore 14' functions in the same manner as bore 14.

The tapering of stop surfaces 12 is such that arm 1 does not extend from the band plane perpendicularly, but forms an angle $\alpha$ with the vertical, so as to get the microphone as accurately as possible in front of the operator's mouth.

FIG. 1 also indicates in dotted lines the manner in which the microphone arm, designated 1', upon disengagement, can be re-engaged on the band end so as to extend, for example, not from the right, but from the left hand side to the operator's mouth.

Since the microphone arm can be pivoted about the axes A, B or C, D, and can also be easily detached, only a small space is required for the headset during storage or transportation, which is a very important advantage.

If wire straps are used, each end of the strap may be coated with plastic, in the shape of an extension 5, 5', or such an extension may be provided thereon.

In FIG. 4, the engagement of catch pin 11 into recess or bore 14 is shown.

Figure 5:
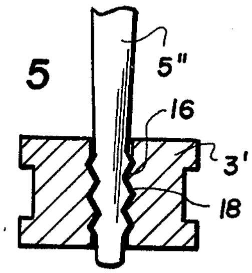
FIG. 5 is a view similar to FIG. 4 showing another embodiment of the invention.

FIG. 5 shows another embodiment for the clamping ring 3' which includes ridges 16 protruding from the surface of a headband end 5". These engage with corresponding ridges 18 in clamping ring 3'.

While specific embodiments of the invention have been shown and described in detail to illustrate the application of the principles of the invention, it will be understood that the invention may be embodied otherwise without departing from such principles.

What is claimed is:

1. A headset, comprising a head band engageable over the head at least one earpiece having a slot therethrough through which said band extends, and a microphone arm having one end with a microphone thereon and an opposite end with an engagement portion which is slidably engageable on said band.

2. A headset according to claim 1, wherein said microphone arm has an annular end part with a portion having an opening therethrough engaged over said band, said band and said annular end part having projection and recess means for interengaging said microphone arm with said band.

3. A headset according to claim 2, wherein said portion comprises a ring in said annular end part with a bore therethrough and said engagement means comprises a projection extending into said ring bore.

4. A headset, according to claim 1, wherein said arm opposite end includes a rotatable bushing having a hole therethrough through which said band extends.

5. A headset, according to claim 4, wherein said band and its hole are of rectangular construction and including catch means for interengaging said band with said ring portion.

6. A headset, according to claim 4, wherein said bushing is made of a resilient material.

7. A headset, according to claim 1, wherein said arm opposite end includes a portion with an opening therethrough, said opening being bevelled inwardly from each end to a central point, said band being flat, means in the opening for pivotally supporting said band therein and holding it in place at the location of the point between the bevelled ends, the surface of said band being such that one side thereof will rest against a bevelled surface adjacent one end of the opening and the opposite side will rest against the bevelled surface on the opposite side of the opening.

8. A headset according to claim 7, said portion including a ring having a hole therethrough rotatably mounted on the opposite portion of said arm and having an opening through which said band extends and snap connection means defined between the interior of the hole of said ring and said band for pivotally supporting said band in said ring.

9. A headset, according to claim 8, wherein said snap connection means comprises a recess in said band, said ring having a projection engageable into said recess.

10. A headset, according to claim 8, wherein said band and said ring have interengageable serrated portions.

11. A headset, according to claim 1, wherein said earpiece has a cylindrical housing portion with a slot therethrough through which the band extends, an additional securement band carried on said earpiece housing shaped to permit engagement thereof by said engagement portion of said arm.

* * * * *